United States Patent [19]

Sherman

[11] Patent Number: 5,607,238

[45] Date of Patent: Mar. 4, 1997

[54] REDUCED FRICTION LINEAR SLIDE WITH ROLLING ELEMENTS

[75] Inventor: Victor Sherman, Astoria, N.Y.

[73] Assignee: Deltron Precision, Inc.

[21] Appl. No.: 560,131

[22] Filed: Nov. 17, 1995

Related U.S. Application Data

[63] Continuation of Ser. No. 192,780, Feb. 7, 1994, abandoned, which is a continuation-in-part of Ser. No. 42,686, Apr. 5, 1993, abandoned.

[51] Int. Cl.⁶ .................................................. F16C 29/04
[52] U.S. Cl. .................................................. 384/49; 384/57
[58] Field of Search .................................. 384/47–50, 56, 384/57

[56] References Cited

U.S. PATENT DOCUMENTS

| | | | |
|---|---|---|---|
| 1,530,272 | 3/1925 | McDermott | 384/57 X |
| 3,003,827 | 10/1961 | Hentschke | 384/49 |
| 3,024,073 | 3/1962 | Krueger | 384/49 |
| 3,342,534 | 9/1967 | King | 384/49 |
| 3,450,447 | 6/1969 | Hacker | 384/49 |
| 3,790,233 | 2/1974 | Polidor | 384/10 |
| 4,517,879 | 5/1985 | Andersson | 384/49 X |
| 4,712,890 | 12/1987 | Dobner | 384/49 X |

*Primary Examiner*—Thomas R. Hannon
*Attorney, Agent, or Firm*—John H. Crozier

[57] ABSTRACT

A linear slide of the type having a carriage member and a base member arranged for relative axial back and forth movement within an opening defined between the carriage and base members, a plurality of rolling elements disposed between rails disposed in the carriage member and the base member, the improvement including: providing the rolling elements loosely disposed in at least one linear group between the carriage member and the base member, without retainers, wherein the length of the at least one linear group can be greater than the product of the diameter of the rolling elements times the number thereof.

19 Claims, 7 Drawing Sheets

REDUCED FRICTION LINEAR SLIDE WITH ROLLING ELEMENTS

CROSS-REFERENCE TO RELATED APPLICATION

This application is continuation of application Ser. No. 08/192,780 filed Feb. 7, 1994 now abandoned, which is a continuation-in-part of copending application Ser. No. 08/042,686, filed Apr. 5, 1993, and titled REDUCED FRICTION LINEAR SLIDE WITH ROLLING ELEMENTS, now abandoned.

BACKGROUND OF THE INVENTION

1. Field of the Invention

The present invention relates to linear slides with rolling elements generally and, more particularly, but not by way of limitation, to a novel linear slide having reduced friction.

2. Background Art

The present invention relates to linear slides with rolling elements which linear slides consist generally of a base, a carriage, rails, rolling elements (balls or rollers), and end plates. These slides are widely used in instrumentation, machine tools, and other similar applications where precision linear movements are required.

Conventional designs of such slides, especially in high accuracy applications, however, still need reduction of friction. The problem of increased friction stems from the fact that during the movement of rolling elements, rigid retainers create unnecessary interference between individual movements of the rolling elements which differ somewhat from the movement of the whole group of rolling elements.

With increased length of slides (and, therefore, the number of rolling elements), the forces involved in such interference become progressively greater which, in addition, results in fast wear of the retainers.

Another problem, non-uniformity of friction which is typical of conventional slides is caused by the fact that the rolling elements (which are held together in groups by retainers), tend to creep eventually toward one of the ends of the slide during its service. Then, they abruptly hit against the end plate or the stop before completion of a stroke, causing the retainer(s) to push the whole group of rolling elements to the end of a stroke without actually rolling. With the combination of a load and a preload, sliding friction developed at such a moment can be ten or more times greater than the regular rolling friction typical of the slide. This fact may result in the malfunction, or even breakage, of the equipment in which the slide is used.

Another mutual disadvantage of conventional slides is the reduced number of rolling elements because of the use of retainers and, therefore, reduced load capacity and rigidity.

Still another disadvantage of prior art is difficulty of repair, since replacement of retainers takes disassembly of the whole unit which destroys preload adjustment of the slide.

Accordingly, it is a principal object of the present invention to provide for a reduced friction linear slide which avoids the disadvantages of conventional slides.

It is a further object of the invention to provide such a linear slide which includes no rigid retainers.

It is an additional object of the invention to provide such a linear slide which avoids sliding friction between the elements thereof.

It is another object of the invention to provide such a linear slide which has a increased number of rolling elements for a given length.

It is yet a further object of the invention to provide such a linear slide which is economically manufactured.

It is yet an additional object of the invention to provide such a linear slide which is easily repaired.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, in a linear slide of the type having a carriage member and a base member arranged for relative axial back and forth movement within an opening defined between said carriage and base members, a plurality of rolling elements disposed between rails disposed in said carriage member and said base member, the improvement comprising: providing said rolling elements loosely disposed in at least one linear group between said carriage member and said base member, without retainers, wherein the length of said at least one linear group can be greater than the product of the diameter of said rolling elements times the number thereof.

BRIEF DESCRIPTION OF THE DRAWING

Understanding of the present invention and the various aspects thereof will be facilitated by reference to the accompanying drawing figures, submitted for purposes of illustration only and not intended to define the scope of the invention, on which.

DETAILED DESCRIPTION OF THE PREFERRED EMBODIMENTS

Reference should now be made to the drawing figures, on which similar or identical elements are given consistent identifying numerals throughout the various figures thereof, and on which parenthetical references to figure numbers direct the reader to the view(s) on which the element(s) being described is (are) best seen, although the element(s) may be seen also on other views.

Figure 1:
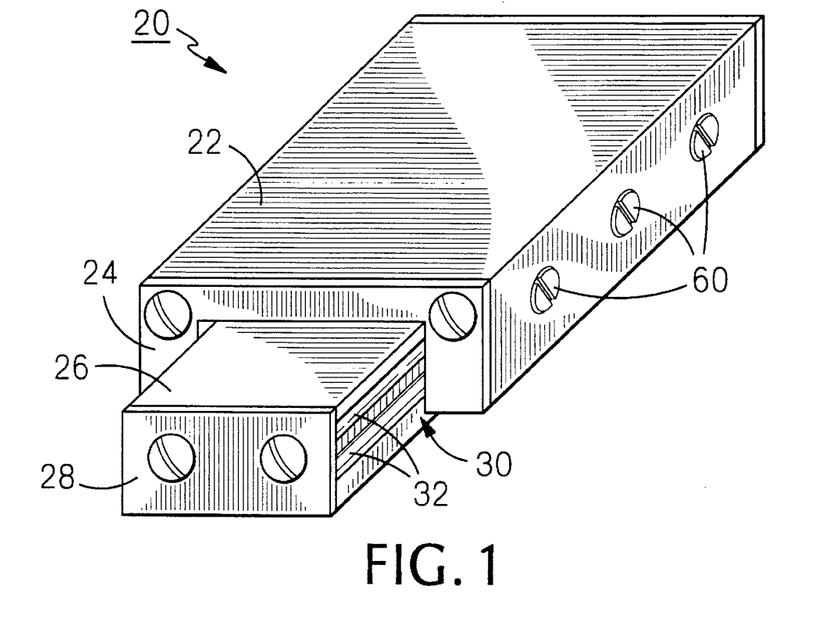
FIG. 1 is an isometric view of the linear slide of the present invention.
Figure 7:
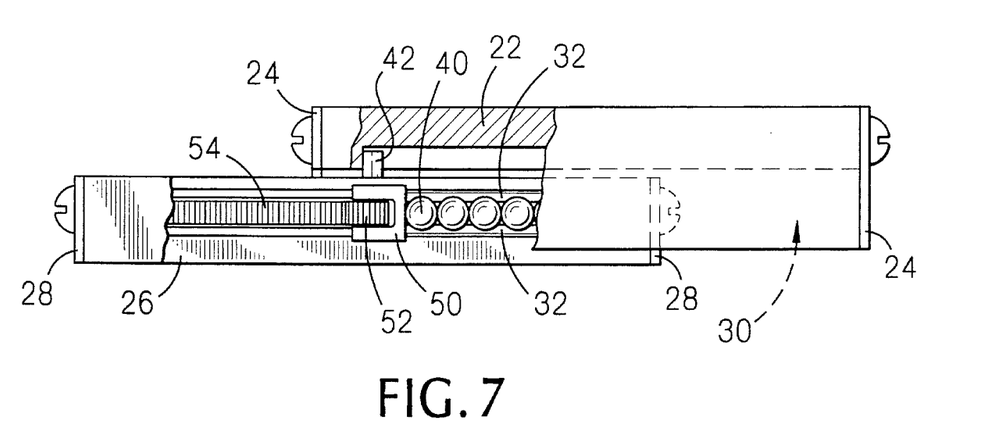
FIG. 7 is a side elevational view, partially cut-away and partially in cross-section, of the linear slide.

Referring primarily to FIGS. 1 and 7, there is illustrated a linear slide constructed according to the present invention, generally indicated by the reference numeral 20. Linear slide 20 includes a carriage member 22 having end plates 24, and a base member 26, having end plates 28. Base member 26 is configured for axial movement relative to carriage member 22 within an opening 30 defined in the lower portion of the carriage member. Carriage member 22 and base member 26 accommodate therebetween rails 32 in corresponding grooves defined in walls of the carriage and base members. Rolling elements 40 between rails 32 carry the load and provide for smooth, low-friction movement of carriage member 22 relative to base member 26. A pin 42 limits the travel of linear slide 20. End plates 24 and 28 provide for integrity of the whole unit. It will be understood that base member 26 would normally be attached to a stationary surface, while carriage member 22 would be attached to a movable load.

Figure 2:
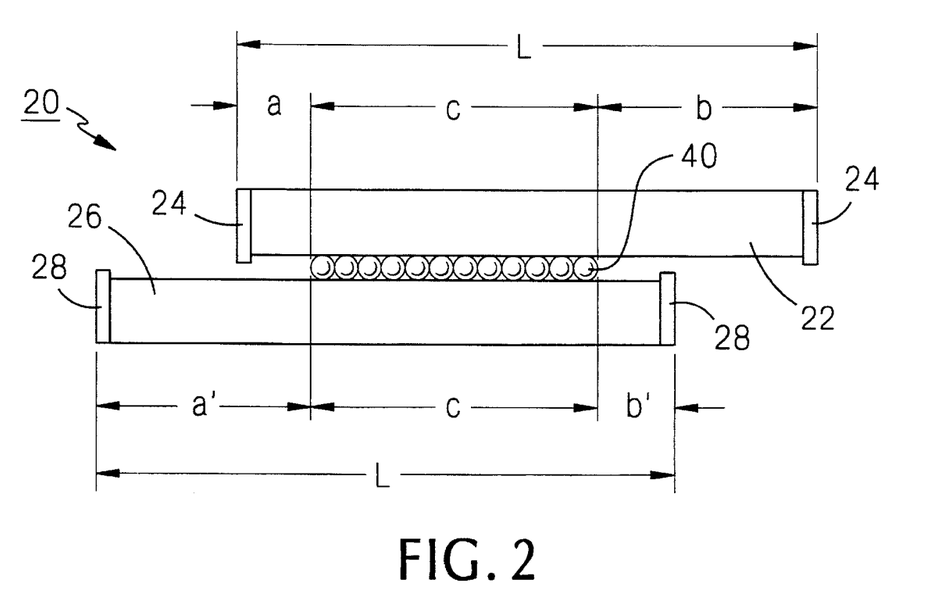
FIG. 2 is a schematic diagram showing the relationships between the groups of balls, the base, and the carriage of the linear slide.
Figure 3:
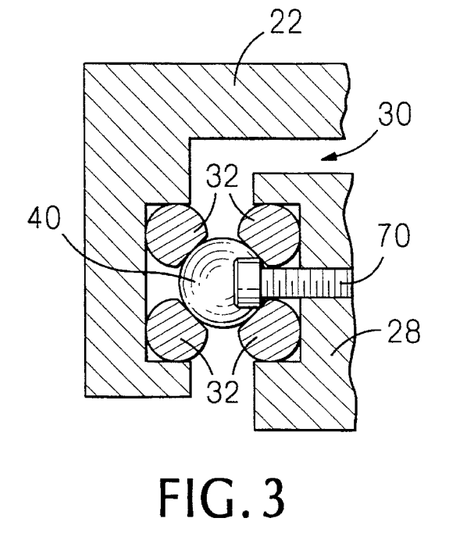
FIG. 3 is an elevational view, in cross-section, showing one way of adjustment of preload in the linear slide.
Figure 4:
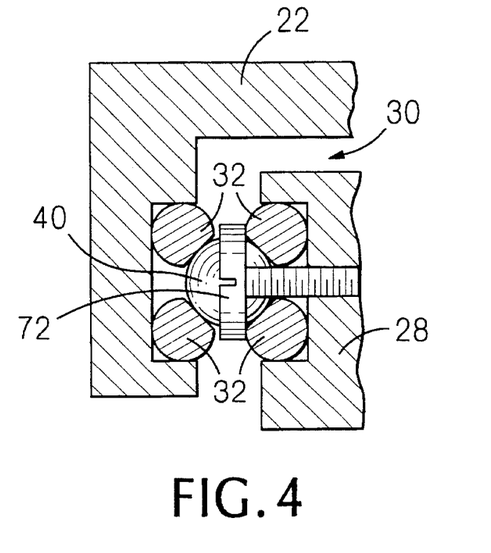
FIG. 4 is an elevational view, in cross-section, showing another way of adjustment of preload in the linear slide.
Figure 15:
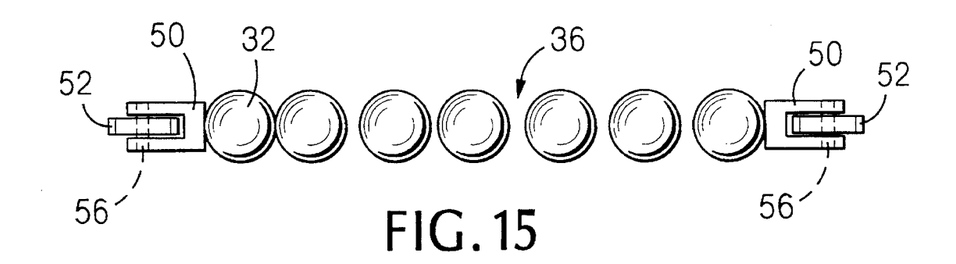
FIG. 15 is a side elevational view showing the interaction between rolling elements and limiters.

In accordance with one aspect of the present invention, rolling elements 40 are in a loose contact with each other, whereas the spaces for their travel contain no rolling elements. Referring to FIG. 2, the operating length of a group of elements 40 is indicated by the letter "c" and the length of spaces for their travel are indicated by the letters "a", "b", "a'" and "b'". The term "loose contact" means here that the operating length "c" is greater than the number of rolling elements 40 times their diameter so that these elements are not pressed tightly against each other, but are somewhat loose within their group, with small clearances between, as at 36 (FIG. 15). These relationships can be expressed by the formula:

$$c > n \times d,$$

where:
n is the number of rolling elements, and
d is the diameter of a rolling element.

As follows from the kinematics of the slides, theoretically correct dimensional relationships between: groups of rolling elements 40, base member 26, and carriage member 22 in the process of slide movement is determined by the following set of formulas:

$$a = b'$$

$$a' = b$$

$$a + b + c = L$$

$$a' = 0.5 \times (L - c + x)$$

$$b' = 0.5 \times (L - c - x)$$

where:
L is the working length of the slide as shown,
x is the current travel of the slide as shown,
c is the operating length of the group of rolling elements 40, and
a, a', b, b' are current distances between ends of groups of rolling elements and inner edges of end plates as defined on FIG. 2.

As can be seen from FIG. 2, the sum "a+b" is equal to the sum "a'b'", each of the sums representing one-half of the slide travel. With respect to the previous formulas, this relationship is expressed through the following formulas:

$$L > a + b + n \times d$$

or:

$$L > a' + b' + n \times d.$$

It has been shown that, in physical reality, progressing of a roller element 40 during a steady movement of carriage member 22 relative to base member 26 is, however, a sum of a theoretically uniform movement to one of the sides, according to the above formulas, plus a multitude of slight random oscillatory movements. These random oscillations are caused by the difference in diameters of rolling elements 40 within tolerances, minute variation in hardness, unevenness of surfaces, etc. Elimination of unnecessary interference between the aforementioned individual oscillatory movements by having rolling elements 40 loosely disposed reduces friction in linear slide 20.

Another advantage of linear slide 20 is the increased number of rolling elements 40 which can be employed, due to the absence of retainers and, therefore, concomitant increased load capacity of the linear slide, or increased smoothness of its movement at the same load (due to reduced stress at the points of contact of individual rolling elements 40 with rails 32).

Referring now to FIGS. 3–6, still further reduction of friction in linear slide 20 is obtained via flattening rails 32 on the sides that contact rolling elements 40 which, in the present case, are balls. This permits increasing the diameter of the rolling elements within the same space envelope, thus not only increasing their load carrying capacity (which is obvious from the standard formula of contact stresses), but also reducing friction because of reduced contact stresses and increased diameter of the rolling elements. In addition, flattening rails 32 results in increased smoothness of operation of linear slide 20.

Figure 8:
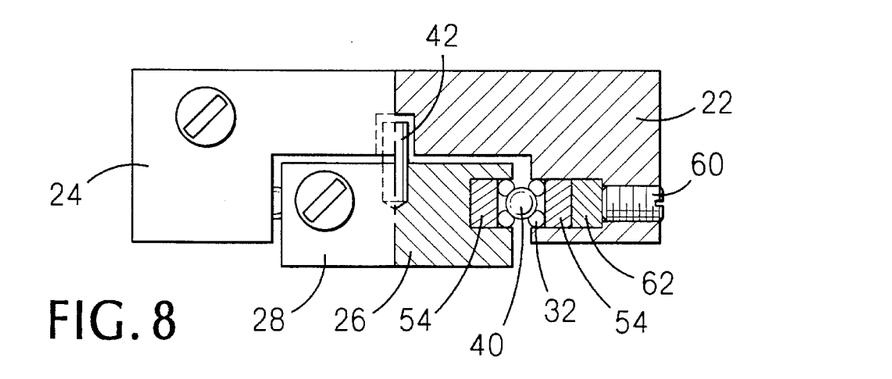
FIG. 8 is a front elevational view, partially in cross-section, of the linear slide.

Another advantage of flattening rails 32 is that, in addition to conventional method of adjustment of a preload (FIGS. 8 and 9) which employs adjustment screws 60 (also FIG. 1)

and gib 62, the inventive flattened rails permit controlling a preload using a new method illustrated on FIGS. 3–6. Here, adjustment of a preload is done by rotating one or more rails 32 around their major axes. As can be seen from FIGS. 3 and 4, this can be done with screws 70 or 72, respectively, located at the end(s) of rail(s) 32 to be adjusted. Screws 70 and 72 press against edges of the flats and force the selective rotation thereof to provide more or less preload.

Figure 5:
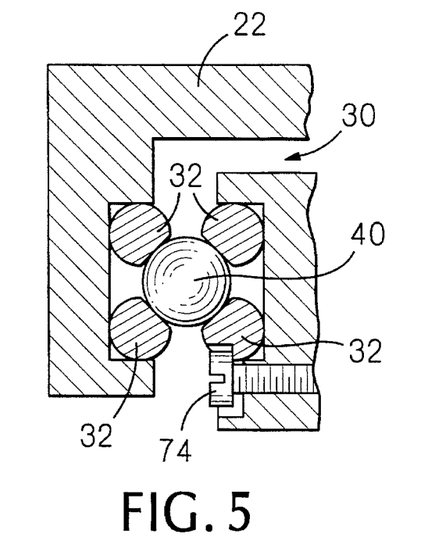
FIG. 5 is an end elevational view, in cross-section, showing still another way of adjustment of preload in the inventive slide.
Figure 6:
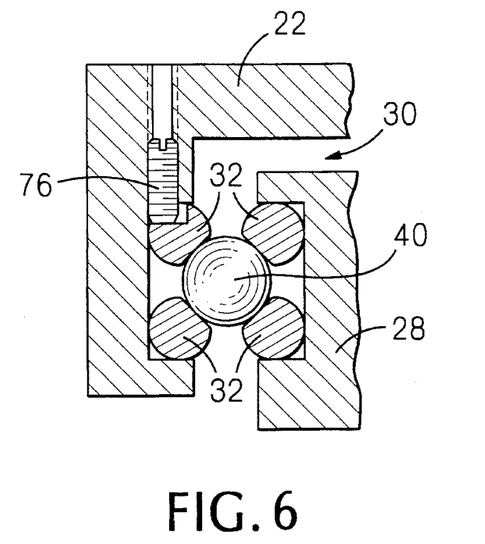
FIG. 6 is an end elevational view, in cross-section, showing yet anther way of adjustment of preload in the inventive slide.

As shown on FIGS. 5 and 6, adjusting the rotation of rails 32 can also be done with screws 74, or 76, respectively, that press against the bottoms of special grooves, or nests in the rails. In this case, location of screw(s) 74, or 76 is not limited by ends of rail(s) 32 only.

Increasing the number of rolling elements with the same size linear slide 20 and, especially, the use of flattened rails 32 increases the stiffness of the linear slide and, therefore, permits the use of less preload. This, in turn, reduces the creep of the rolling elements. Completely eliminating the creep, however, requires positive movement of the group of balls.

Figure 14:
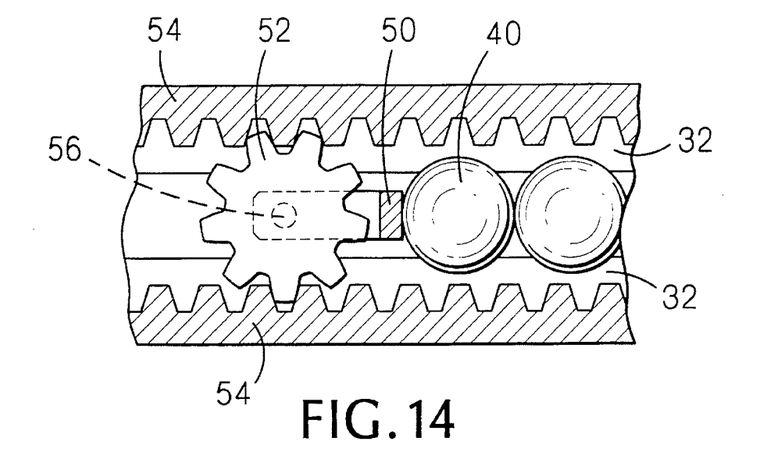
FIG. 14 is a fragmentary, top plan view, in cross-section, showing another type of a limiter.

According to another aspect of the present invention, in order to eliminate creep of rolling elements 40 to one of the ends of linear slide 20, and, therefore, the aforementioned non-uniformity of friction, the linear slide 20 has its rolling elements held in a group, or groups, with positively moving limiters 50 (FIGS. 7, 14, and 15) located at each end of the group(s). In order to provide for the positive movement, limiters 50 have gears 52 (Figure 14) that are in engagement with gear racks 54 attached to both carriage member 22 and base member 26. Gears 52 are rotatably attached to limiters 50 by means of shafts 56.

In order to provide the necessary looseness of contact between rolling elements 40, limiters 50 are engaged with gear racks 54 in such a manner that the distance "c" (FIG. 2) between the internal sides of the limiters exceeds the product of the number of rolling elements 40 times their diameter. Preferably, the distance will be at least one-fourth larger than the diameter of a rolling element 40.

Since limiters 50 are in engagement with gear racks 54, their movement is free from frictional creep and accurately follows the theoretical pattern. Because of this, limiters 50 limit creep of rolling elements 40 and correct the mislocations of the rolling elements. Since limiters 50 are placed on both sides of the group of rolling elements 40, the work of such correcting is distributed between two gears 52.

Figure 18:
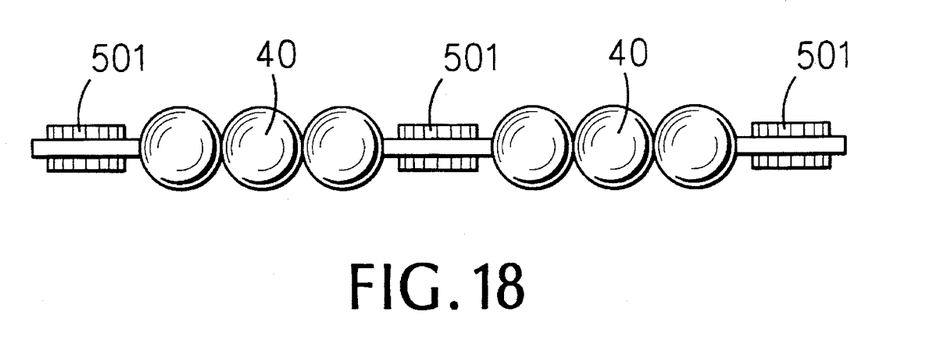
FIG. 18 is side elevational view showing locating limiters in slides with large number of rolling elements.

In longer linear slides with larger numbers of rolling elements 40, it is possible to use several limiters 50 which divide the group into several sub-groups and, therefore, take their part in sharing the force of correcting locations of rolling elements 40. This is illustrated on FIG. 18 where three limiters 501 are employed with two groups of rolling elements 40 (only a relatively small number of each being shown for illustrative purposes only).

Figure 9:
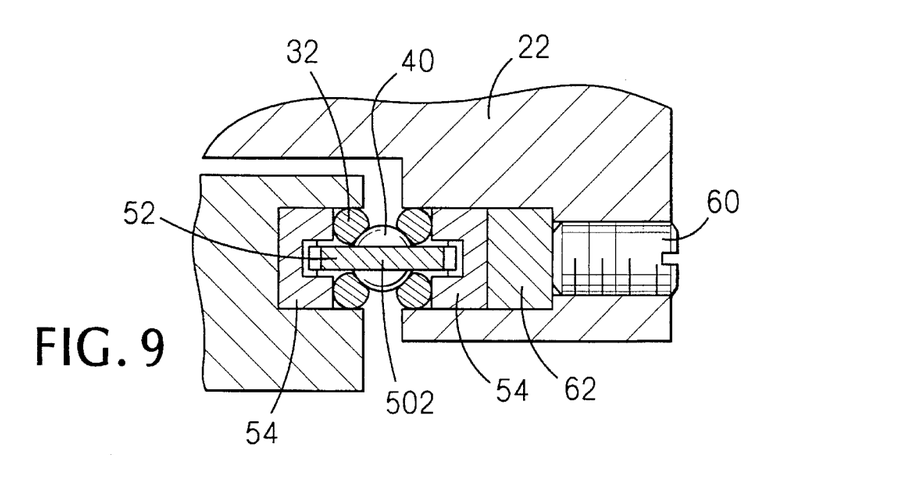
FIG. 9 is a fragmentary, end elevational view, in cross-section, of the linear slide showing a gear-limiter thereof.
Figure 10:
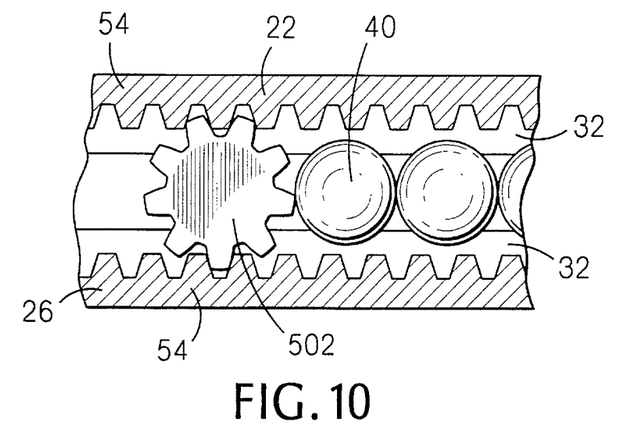
FIG. 10 is a fragmentary, top plan view, in cross-section of the linear slide showing a group of balls and a gear-limiter.

Referring now to FIGS. 9 and 10, the simplest limiter is a plain gear 502 engaged with gear racks 54. Plain gear limiter 502 proves to be practical for smaller dimension slides and/or with less preload.

Figure 12:
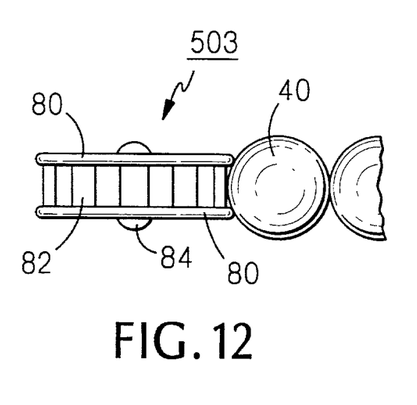
FIG. 12 is a fragmentary, end elevational view showing another type of a limiter and a group of rolling elements.
Figure 13:
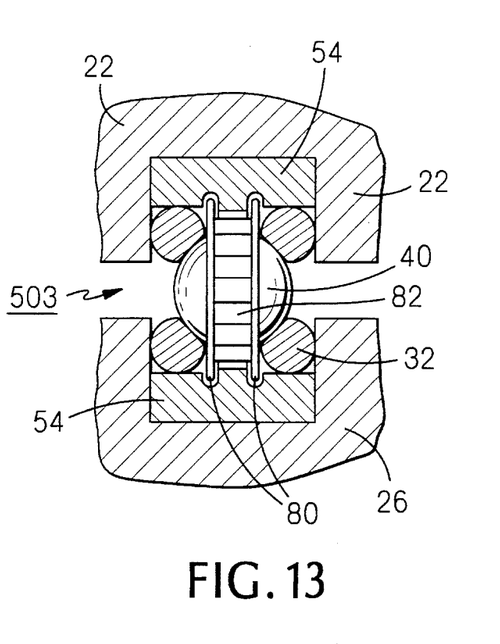
FIG. 13 is a fragmentary, end elevational view, in cross-section, of the linear slide showing the rolling elements and limiters.

Another type of limiter, generally indicated by the reference numeral 503, is shown on FIGS. 12 and 13. Here, rolling element 40 contacts discs 80 attached to the sides of a gear 82, for instance by a rivet 84. The attachment itself can be either rigid, or with a possibility of rotation of discs 80 relative to gear 82 which feature reduces friction between the rolling elements and the limiter.

Figure 11:
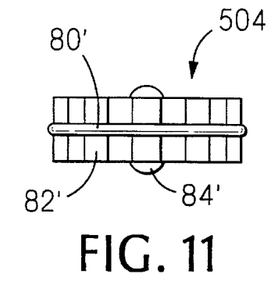
FIG. 11 is an end elevational view showing another type of limiter.

FIG. 11 illustrates a similar design of limiter, generally indicated by the reference numeral 504, but with an annular disk 80' disposed in the middle of the gear. Alternatively, gear 82' could be split into upper and lower gears with disk 80' being solid. The elements of this arrangement could also have rotational movement therebetween for reduced friction.

Figure 16:
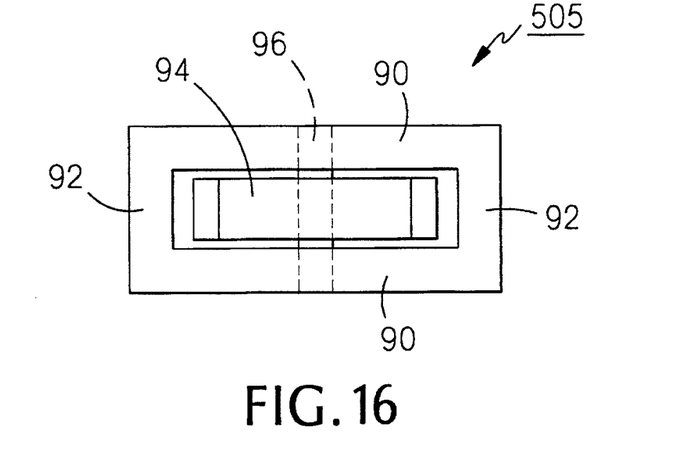
FIG. 16 is a fragmentary, end elevational view showing still another type of a limiter.
Figure 17:
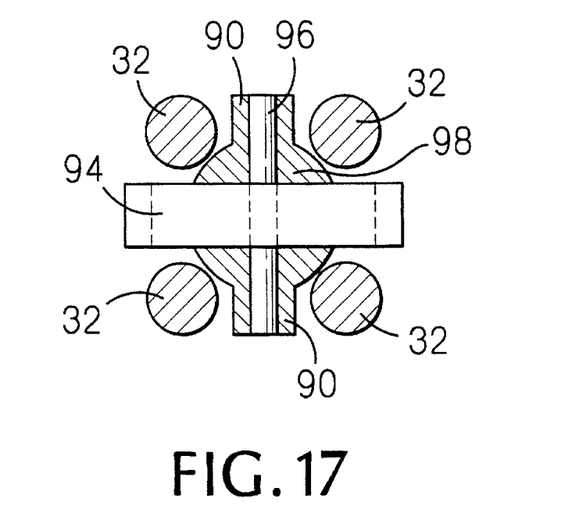
FIG. 17 is a fragmentary, end elevational view, partially in cross-section, showing another type of limiter.

FIG. 16 illustrates another design of limiter, generally indicated by the reference numeral 505, this one having a closed frame formed of cojoined upper and lower members 90 and side members 92, with a gear 94 rotatably disposed therein on a shaft 96. In order to enhance guiding of limiter 505 between rails 32, its profile can have a cylindrical portion 98 as shown on FIG. 17. The diameter of this portion will be somewhat smaller than the diameter of rolling elements 40.

Figure 19:
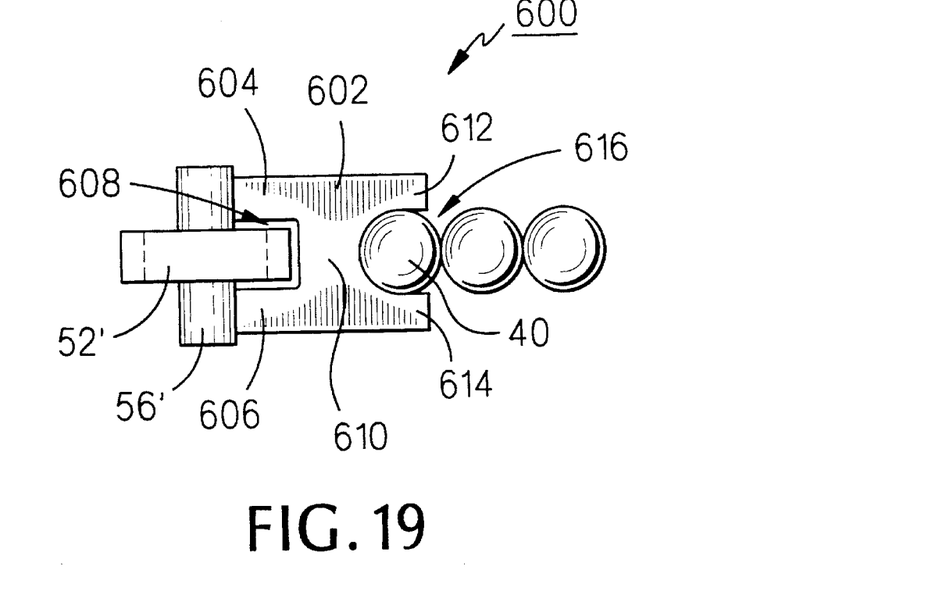
FIG. 19 is a side elevational view showing yet another type of limiter.
Figure 20:
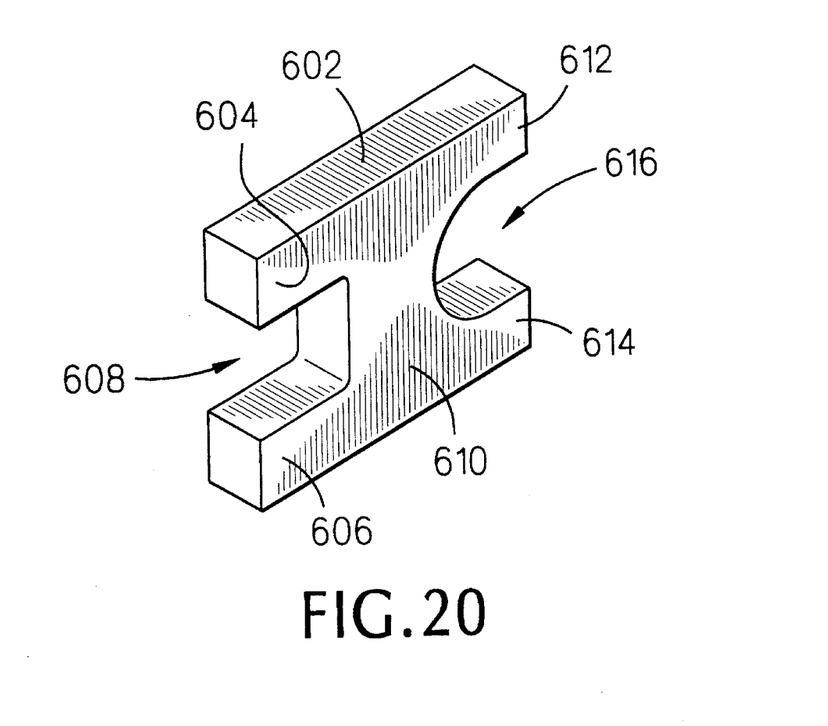
FIG. 20 is an isometric view of an element of the limiter of FIG. 19.

FIGS. 19 and 20 illustrate another design of limiter, generally indicated by the reference numeral 600. Limiter 600 includes a gear 52' mounted on a shaft 56', generally similar to gear 52 and shaft 56 shown on FIG. 14, except that shaft 56' is of somewhat greater diameter than shaft 56 and the shaft is unjournalled. Limiter 600 includes a vertical, double-forked, bearing member having first and second arms 604 and 606 extending horizontally from a central body portion 610 such that the distal ends of the first and second forks engage shaft 56' on either side of gear 52' and define therebetween an opening dimensioned to accommodate therein the gear. Extending from central body portion 610 and oppositely from first and second arms 604 and 606 are third and fourth arms 612 and 614 which define therebetween an opening dimensioned to accommodate therein a rolling element 40.

Still another advantage of the present invention is easing the repair of linear slide 20, since replacement of work retainers and gears 52 requires simply opening end plates 24 and 28 and replacing limiters 50 at each end of the linear slide.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

I claim:

1. In a linear slide of the type having a carriage member and a base member arranged for relative axial back and forth movement within an opening defined in said carriage member, a plurality of rolling elements, comprising balls, disposed between rails disposed in said carriage member and said base member, the improvement comprising:

(a) providing said rolling elements loosely disposed in at least one linear group between said carriage member and said base member, without retainers, wherein the length of said at least one linear group can be greater than the product of the diameter of said rolling elements times the number thereof; and (b) providing said rails as generally round rods with flats formed in a surface of each, said flats being formed along lines of contact with said balls.

2. A linear slide, as defined in claim 1, wherein preload adjustment of said linear slide is accomplished by rotation of at least one of said rails around its major axis so as to increase or decrease force of said at least one of said rails against said rolling elements.

3. A linear slide, as defined in claim 2, wherein said rotation is accomplished by means of adjusting a screw that presses against a bottom of a groove defined in said at least one of said rails so as to effect rotation of said at least one of said rails.

4. A linear slide, as defined in claim 2, wherein said rotation is accomplished by means of adjusting a head screw that presses its head against edges of said flats so as to effect rotation of said at least one of said rails.

5. In a linear slide of the type having a carriage member and a base member arranged for relative axial back and forth movement within an opening defined in said carriage member, a plurality of rolling elements disposed between rails disposed in said carriage member and said base member, the improvement comprising:

(a) providing said rolling elements loosely disposed in at least one linear group between said carriage member and said base member, without retainers, wherein the length of said at least one linear group can be greater than the product of the diameter of said rolling elements times the number thereof; and (b) providing two positively moving limiters, one at each end of said at least one group of rolling elements, so as to prevent creep of said rolling elements relative to said rails.

6. A linear slide, as defined in claim 5, wherein said limiters are in engagement with two gear racks disposed in proximity to the path of travel of said rolling elements, one of said two gear racks being fixedly disposed in said carriage member and the other of said two racks being fixedly disposed in said base member.

7. A linear slide, as defined in claim 6, wherein said limiters are plain gears.

8. A linear slide, as defined in claim 6, wherein said limiters each comprise:

(a) a U-shaped frame having the outside face of the closed base thereof oriented to contact an end one of said at least one group of rolling elements; and (b) a gear rotatingly disposed in said U-shaped frame by means of a shaft extending across the open end of said U-shaped frame, said gear extending outwardly from said U-shaped frame and engaging said gear racks.

9. A linear slide, as defined in claim 6, wherein said limiters each comprise:

(a) a closed frame having a face thereof oriented to contact an end one of said at least one group of rolling elements; and (b) a gear rotatingly disposed in said closed frame by means of a shaft extending between opposite sides thereof, said gear extending outwardly from said closed frame and engaging said gear racks.

10. A linear slide, as defined in claim 6, wherein said limiters each comprise:

(a) a cylindrical gear having upper and lower surfaces and a first outside diameter, said cylindrical gear engaging said gear racks;

(b) two cylindrical disks disposed at said upper and lower surfaces of said gear and having a second outside diameter; and (c) said second outside diameter being greater than said first outside diameter such that outer peripheral edges of said disks contact an end one of said at least one group of rolling elements.

11. A linear slide, as defined in claim 10, wherein said cylindrical gear and said cylindrical disks are mutually rotatable.

12. A linear slide, as defined in claim 6, wherein said limiters each comprise:

(a) a cylindrical gear having a first outside diameter, said cylindrical gear engaging said gear racks;

(b) a cylindrical, annular disk medially disposed around said gear and having a second outside diameter; and (c) said second outside diameter being greater than said first outside diameter such that an outer peripheral edge of said annular disk contacts an end one of said at least one group of rolling elements.

13. A linear slide, as defined in claim 12, wherein said cylindrical gear and said annular disk are mutually rotatable.

14. A linear slide, as defined in claim 6, wherein said limiters each comprise:

(a) two superposed cylindrical gears having a first diameter, said cylindrical gears engaging said gear racks;

(b) a round disk disposed between said gears and having a second diameter; and (c) said second diameter being greater than said first diameter such that an outer peripheral edge of said round disk contacts an end one of said at least one group of rolling elements.

15. A linear slide, as defined in claim 14, wherein said cylindrical gears and said annular disk are mutually rotatable.

16. A linear slide, as defined in claim 5, wherein rolling element contacting surfaces of said limiters are spaced apart a predetermined distance such that said distance is greater than the product of the number of said rolling elements times the diameter thereof.

17. A linear slide, as defined in claim 16, wherein said distance exceeds the product of the number of said rolling elements times the diameter thereof by at least one-fourth said diameter.

18. A linear slide, as defined in claim 5, wherein said rolling elements are disposed in at least two groups, with limiters disposed at the ends of and in between said at least two groups.

19. A linear slide, as defined in claim 5, wherein each of said limiters comprises:

(a) a horizontal gear in engagement with two gear racks disposed in proximity to the path of travel of said rolling elements, one of said two gear racks being fixedly disposed in said carriage member and the other of said two gear racks being fixedly disposed in said base member;

(b) a vertical, cylindrical shaft fixedly attached to said gear and extending above and below upper and lower surfaces of said gear;

(c) a vertical, double-forked bearing member extending from said gear and said shaft to at least a first of said rolling elements;

(d) first and second arms extending from a central body portion of said bearing member, the distal ends of said first and second arms engaging said shaft above and below said gear, and said first and second arms defining therebetween an opening dimensioned to accommodate therein said gear; and (e) third and fourth arms extending from said central body portion and oppositely from first and second arms, and said third and fourth arms defining therebetween an opening dimensioned to accommodate therein said at least a first of said rolling elements.

* * * * *